(12) United States Patent
Schlosser

(10) Patent No.: US 7,935,274 B2
(45) Date of Patent: May 3, 2011

(54) PHOSPHONIC ACID AND POLYVINYL ALCOHOL CONVERSION COATING

(75) Inventor: Ted M. Schlosser, Tamaqua, PA (US)

(73) Assignee: Bulk Chemicals, Inc., Reading, PA (US)

( * ) Notice: Subject to any disclaimer, the term of this patent is extended or adjusted under 35 U.S.C. 154(b) by 1442 days.

(21) Appl. No.: 11/089,943

(22) Filed: Mar. 25, 2005

(65) Prior Publication Data

US 2006/0214137 A1    Sep. 28, 2006

(51) Int. Cl.
*C23F 11/00*    (2006.01)

(52) U.S. Cl. ............ 252/389.2; 252/389.21; 106/14.12; 106/14.44; 106/287.19

(58) Field of Classification Search .............. 252/389.2, 252/389.21
See application file for complete search history.

(56) References Cited

U.S. PATENT DOCUMENTS

| | | | | |
|---|---|---|---|---|
| 4,016,129 A * | 4/1977 | Miyosawa | .................. | 524/557 |
| 5,032,237 A * | 7/1991 | Wieserman et al. | .......... | 205/188 |
| 5,089,150 A * | 2/1992 | Hen | .............................. | 507/221 |
| 5,164,234 A | 11/1992 | Siebert | | |
| 5,248,525 A | 9/1993 | Siebert | | |
| 5,300,323 A | 4/1994 | Ahmed | | |
| 5,393,353 A | 2/1995 | Bishop | | |
| 5,427,863 A | 6/1995 | Siebert | | |
| 5,462,592 A | 10/1995 | Murakami et al. | | |
| 5,859,106 A | 1/1999 | Jones et al. | | |
| 5,859,107 A | 1/1999 | Jones et al. | | |
| 5,968,203 A | 10/1999 | Brown | | |
| 6,083,308 A * | 7/2000 | Fletcher | .................... | 106/14.12 |
| 6,126,997 A | 10/2000 | Rivera et al. | | |
| 6,261,638 B1 * | 7/2001 | van Ooij et al. | ............. | 427/379 |
| 6,476,119 B1 | 11/2002 | Kucera et al. | | |
| 6,478,860 B1 | 11/2002 | Nakayama et al. | | |
| 2002/0026882 A1 * | 3/2002 | Patel | .......................... | 106/14.11 |
| 2003/0075453 A1 * | 4/2003 | Dolan | .......................... | 205/324 |
| 2003/0213533 A1 * | 11/2003 | Sako et al. | .................... | 148/243 |

FOREIGN PATENT DOCUMENTS

| | | | |
|---|---|---|---|
| DE | 19754108 A1 * | 6/1999 | |
| JP | 9316434 | 12/1997 | |
| WO | WO 97/09127 | 3/1997 | |
| WO | WO 9929927 A2 * | 6/1999 | |
| WO | WO 2004016906 A1 * | 2/2004 | |

OTHER PUBLICATIONS

Kirk-Othmer, "Encyclopedia of Chemical Technology", 1983, John Wiley & Sons, 3rd Edition, vol. 23, pp. 848-865.*
English machine translation of Kuepper et al., WO 9929927 A2, 1999.*

* cited by examiner

*Primary Examiner* — Mark Eashoo
*Assistant Examiner* — Peter F Godenschwager
(74) *Attorney, Agent, or Firm* — RatnerPrestia

(57) ABSTRACT

Compositions for preparing coatings on metal substrates include a phosphonic acid, polyvinyl alcohol, an optional catalyst, and optionally an organo-functional silane. The catalyst may be a group IV-B compound, a boron compound, a vanadium compound, or a molybdenum compound. The compositions may be applied from an aqueous carrier to a metal surface and then dried to form a coating imparting good paint adhesion and corrosion resistance to the metal substrate.

27 Claims, No Drawings

PHOSPHONIC ACID AND POLYVINYL ALCOHOL CONVERSION COATING

FIELD OF THE INVENTION

The invention relates to coatings for metals. More particularly, it relates to chromium-free conversion coatings that provide excellent corrosion resistance to the metal substrate.

BACKGROUND OF THE INVENTION

Known methods of treating metal surfaces to improve paint adhesion and corrosion resistance of the painted metal surfaces include two general classes of chemistries. The first class is based on traditional conversion coating types of chemistries, such as zinc phosphate, iron phosphates, chromium chromate, chromium phosphate, etc. The second class is based on more recent developments in the metal pretreatment industry and is characterized by what is now referred to as "dried-in-place" technology. Traditional conversion coating chemistries require rinsing of the metal substrate to remove applied pretreatment solution. Dried-in-place chemistries allow for the applied solutions to be dried on the metal substrate to which they are applied, without subsequent rinsing.

Chromium compounds have been used as traditional conversion coatings to treat metal surfaces. Such chromium compounds show toxicological effects and have been determined by the Environmental Protection Agency to be a risk to the environment and by the Occupational Safety and Health Agency to be a health risk. Moreover, hexavalent chromium compounds such as are used in some of these systems are classified as carcinogens by these agencies.

As a result, much effort has been expended in developing compositions and methods for producing chromium-free pretreatments. For example, the owner of the present application has commercialized products that are successful in improving the corrosion resistance and paint adhesion of metal surfaces. Such compositions are disclosed in, for example, U.S. Pat. No. 5,859,106 to Jones et al, directed to an aqueous composition including a polymer system having carboxylic functional groups and hydroxyl groups and a compound of a group IV-B element.

One application for conversion coatings is the pretreatment of metal coils. In a pretreatment coating operation, a coil (roll) of metal is unwound, cleaned, pretreated with the conversion coating to improve corrosion resistance and/or paint adhesion, and then decorated (e.g., painted and baked). The painted stock is then rewrapped and ultimately used to create articles which, already having been painted, require no additional decorating step. Thus, a convenient and economic means for producing painted articles is achieved.

Because the prepainted coil must be cut, bent, impacted, and shaped into a desired article, good adhesion of the paint to the metal surface is important. Further, corrosion resistance can be of importance since an article produced from painted coil can be required to perform in severe weather. Articles such as siding and rainwear (e.g., gutters and spouts) are some examples. Thus, improved conversion coating materials and methods for applying them are constantly sought.

SUMMARY OF THE INVENTION

In one aspect, the invention provides a composition for forming a coating on a metal surface. The composition includes a phosphonic acid, polyvinyl alcohol, and water.

In another aspect, the invention provides a method of making a composition for forming a coating on a metal surface. The method includes combining in aqueous solution a phosphonic acid, polyvinyl alcohol, and a catalyst selected from the group consisting of group IV-B compounds, boron compounds, vanadium compounds, and molybdenum compounds.

In yet another aspect, the invention provides a method of forming a coating on a metal surface. The method includes applying to the metal surface a composition including a phosphonic acid, polyvinyl alcohol, water, and a catalyst selected from the group consisting of group IV-B compounds, boron compounds, vanadium compounds, and molybdenum compounds, the phosphonic acid being soluble in the composition.

In still another aspect, the invention provides a metal surface having disposed thereon a coating. The coating is made by a method including applying to the metal surface a composition including a phosphonic acid, polyvinyl alcohol, water, and a catalyst selected from the group consisting of group IV-B compounds, boron compounds, vanadium compounds, and molybdenum compounds, the phosphonic acid being soluble in the composition.

DETAILED DESCRIPTION OF THE INVENTION

Compositions according to the invention include a phosphonic acid, polyvinyl alcohol (PVA), water, and optionally a catalyst selected from group IV-B compounds, boron compounds, vanadium compounds, and molybdenum compounds. The performance of the compositions may be especially improved in applications on ferrous metals. The inclusion of an organo-functional silane in compositions of this invention, while not essential, may improve performance in certain applications, for example the passivation of zinc, aluminum, magnesium, or zinc/aluminum alloy surfaces. It has been found that the compositions of this invention may be applied to a variety of metals to provide conversion coatings that improve corrosion resistance and adhesion of coatings. As used herein, the term "metal," used for example in the phrase "metal surface," includes aluminum, iron, zinc, and combinations thereof. Each metal listed includes both the elemental metal and alloys thereof; for example, the term "aluminum" means aluminum and aluminum alloys, with an aluminum alloy being a metal in which aluminum is present in an amount at least equal to that of any other element. Iron alloys include cold rolled steel, electro-galvanized steel, and hot-dipped galvanized steel.

The compositions can be used on a variety of metals, including at least galvanized steel, aluminum, magnesium, brass, zinc, cold-rolled steel, and hot-rolled steel. They may be used as a final seal over a zinc phosphate or iron phosphate conversion coating, in place of chrome treatment. They may also be used to pretreat aluminum extrusions prior to painting, or to passivate galvanized surfaces, in place of chromium treatment, for instance on Galfan® zinc-aluminum alloy, electrogalvanized metals, and hot dip galvanized metals. When used on galvanized metals, they may be used with or without further painting. One particularly suitable application is as a pretreatment prior to powder coating, for example with a polyester powder coating formulation.

It is preferred that the compositions be as free as possible of alkali metals, since these tend to promote corrosion. In particular, a level of less than 500 ppm of alkali metals, and typically less than 50 ppm, is desirable. Also, in some embodiments, it is desirable to minimize the presence of alkaline earth metals, with the same typical limits applicable as noted above for alkali metals. The weight ratio of the phosphonic acid to the polyvinyl alcohol is typically at least 1:1, and more typically at least 2.5:1. The weight ratio is typically at most 6:1, and more typically at most 3.5:1.

It is to be understood that, when an amount of any given component of the composition is recited herein, the amount of the component is calculated on the basis of the compound as named, even though not all of it may be in that form in the composition. Thus, for example, a significant amount of the phosphonic acid component may actually be in the form of a salt (such as an ammonium salt) in the composition, but amounts of phosphonic acid are calculated based on the free acid itself. Similar considerations apply to other ingredients that may be present in more than one form.

An as-used composition, i.e. one that is applied to a metal surface, typically has a nonvolatiles concentration much lower than does a concentrated product such as might be used for storing and shipping. For example, 0.352 to 3.52% nonvolatiles, such as may typically be used for storing and shipping the product. End-use concentration levels are typically between 0.007 to 0.07% nonvolatiles, although any concentration may be used.

In one exemplary embodiment of the invention, a concentrated composition may include about 0.32 wt % of PVA, about 2.00 wt % of ATMP, about 0.10% of ammonium fluozirconate, and about 0.6 wt % of 21% aqueous ammonium hydroxide. The composition has good stability in storage, and even longer stability if diluted about 10-fold with water. Such a diluted composition may typically itself be diluted 50-fold with water before application to a surface to be treated, although other concentrations may be used. In general, the overall concentration of ingredients used for a particular application depend on a number of process parameters, such as line speed and temperature. In addition, appropriate concentration ranges of the various components is dependent on their solubilities. At concentrations too low, there is insufficient coating to cover the metal surface. Above the solubility limits, the polymers begin to come out of the solution. Formulating compositions according to the invention in light of these constraints is well within the ability of the person of normal skill in the art. In general, it is desirable that compositions according to the invention be essentially free of insoluble material, the presence of which may result in defects in coatings made with the compositions.

The pH of the compositions is typically between 2.0 and 6.5, more typically between 3.5 and 6.0. The required pH may be obtained by adding ammonia, if needed, to raise pH to the desired level. The ammonia may be added as a gas, or by the addition of aqueous ammonium hydroxide. In some embodiments of the invention, ethanolamine or diethanolamine may be used instead of, or in addition to, ammonia. Although the adjustment of pH with ammonia, ethanolamine, and/or diethanolamine in the compositions of this invention is not usually essential, such inclusion typically helps to increase stability of the compositions during storage. These same pH ranges are appropriate whether the composition is in a concentrated form or at a concentration ready to apply to a metal substrate.

Phosphonic Acid

Many phosphonic acids are suitable for use, provided that they have sufficient solubility in the coating composition. Typically, all of the phosphonic acid is dissolved in the composition. One class of phosphonic acids for use according to the invention includes polyphosphonic acids. The term "polyphosphonic acid", as used herein, means a compound comprising two or more phosphonic acid moieties per molecule. A wide variety of polyphosphonic acids is suitable for use. In one exemplary embodiment, the polyphosphonic acid comprises a polymethylenephosphonic acid according to formula I $$(HO)_2P(O)CH_2—R^1—CH_2(O)P(OH)_2 \qquad I$$

wherein $R^1$ is a divalent organic radical which may comprise additional phosphonic acid groups. In some embodiments of the invention, $R^1$ comprises a structure according to formula II $$NR^3—R^2—NR^4 \qquad II$$

wherein $R^2$ is a divalent organic radical that may comprise additional phosphonic acid groups, and $R^3$ and $R^4$ are each separately hydrogen or an alkyl group having from one to twenty carbon atoms.

Another exemplary group of suitable polymethylenephosphonic acids comprises compounds with an ethylenediamine or polyethylenediamine backbone, having a structure according to formula III $$R^5—(—NR^6—CH_2—CH_2—)_n—NR^7R^8 \qquad III$$

wherein n is an integer from 1 to 10, and each of $R^5$, $R^6$, $R^7$, and $R^8$ is independently hydrogen, a hydrocarbyl group having from one to twenty carbon atoms, or a phosphonomethyl group, provided that at least two of $R^5$, $R^6$, $R^7$, and $R^8$ are phosphonomethyl groups. In some polyphosphonic acids useful according to the invention, n is an integer from 2 to 5 and all of $R^5$, $R^6$, $R^7$, and $R^8$ are phosphonomethyl groups. Examples of such compounds include ethylenediaminetetramethylenephosphonic acid (EDTMPA) and diethylenetriaminepentamethylenephosphonic acid (DTPMP). DTPMP is available from Solutia of St. Louis, Mo.

Other examples of suitable polyphosphonic acids include polyethylenediamines wherein two or more nitrogen atoms in the backbone each bear at least one phosphonomethyl moiety substituted thereon, and/or wherein the polyphosphonic acid comprises at least one nitrogen atom bearing at least two phosphonomethyl moieties substituted thereon. Further suitable examples include 1-hydroxyethane-1,1-diphosphonic acid (HEDP), aminotrimethylenephosphonic acid (ATMP), hexamethylenediaminetetramethylenephosphonic acid, 2-hydroxyethyliminobis(methylenephosphonic acid) (HEBMP), and bis(hexamethylene)triaminepentamethylenephosphonic acid (BHMTPMP). It has been found that phosphonic acids comprising amine functionality, especially secondary or tertiary amine functionality, are often particularly effective, and such compounds include (but are not limited to) acids according to structures II and III above.

Many monophosphonic acids, i.e. compounds containing a single phosphonic acid moiety per molecule, are also suitable for use in the compositions of this invention. Exemplary nonlimiting examples include aminomethylphosphonic acid, vinylphosphonic acid, phosphonosuccinic acid, and 2-phosphonobutane-1,2,4-tricarboxylic acid (PBTC).

Polyvinyl Alcohol

Suitable polyvinyl alcohols may be chosen from a wide range of molecular weights, and may or may not be essentially fully hydrolyzed. That is, they may or may not be essentially free of acetate ester content. Higher molecular weight PVA's, for example those in the range of 146,000 to 186,000 Daltons, have generally been found to work better than lower molecular weight (e.g., 85,000-124,000 Daltons) versions for coil coating. Superhydrolyzed (<1 mole % ester content), relatively low molecular weight grades of PVA, for example a product sold as Celvol™ 125 by Celanese (Calvert City, Ky.), may provide particularly good passivation performance on steel substrates, while higher molecular weight and less completely hydrolyzed PVA's (for example Celvol™ 340 and Celvol™ 540) may tend to give better performance on zinc substrates. Mixtures of PVA's having different molecular weight ranges and different degrees of hydrolysis may also be used, and may provide good all-around performance. For example, an approximately 2:1 weight ratio of Celvol™ 125 to Celvol™ 540 may give good overall performance on a variety of substrates.

Catalyst

Optionally, a catalyst may be included in compositions according to the invention. A number of catalysts are suitable for such use, including compounds of group IV-B elements. As used herein, the term "group IV-B compound" means an acid and/or a salt derived from a group IV-B element, as described in U.S. Pat. No. 5,859,106 to Jones et al., incorporated herein by reference. Such acids include fluozirconic acid ($H_2ZrF_6$), fluotitanic acid ($H_2TiF_6$), and fluohafnic acid ($H_2HfF_6$). An exemplary salt of a Group IV-B element is ammonium zirconium carbonate. An ammonium zirconium carbonate solution sold by Magnesium Elektron Inc. of Flemington, N.J. under the trademark Bacote®20, having a working empirical formula of $(NH_4)_2[Zr(OH)_2(CO_3)_2] \cdot nH_2O$, may be used according to the present invention. Without wishing to be bound by any particular theory or explanation, it appears that group IV-B elements, such as zirconium, increase the interaction between the composition and the metal surface, in effect helping to bond the composition to the metal surface. Complexes comprising these elements, especially those also containing ammonium ions, are in most cases effective catalysts. In addition, compounds containing vanadium, or molybdenum, especially in the form of ammonium complexes, are effective, as are inorganic boron compounds. Suitable exemplary catalysts include ammonium biborate, zinc ammonium zirconium carbonate, ammonium fluozirconate, ammonium fluotitanate, ammonium vanadate, and ammonium dimolybdate, all of which are commercially available commercially from suppliers such as Magnesium Elektron. A suitable catalyst concentration is typically 50-100 ppm by weight, in the composition as used for application to a metal substrate.

Organo-Functional Silane

Organo-functional silences may optionally be incorporated in the compositions of this invention, and their presence may result in improved adhesion performance in some applications. As used herein, the term "silane" has the same meaning as defined in U.S. Pat. No. 5,393,353 to Bishop, which is incorporated herein by reference. In addition, the term "organo-functional silane" has the same meaning as defined in U.S. Pat. No. 6,126,997 to Rivera et al., also incorporated herein by reference. Specifically, the term "organo-functional silane" means a silane which includes an organic group (such as an alkyl, an aryl or an alkoxy group) and a functional group which serves to bond with or assist in bonding with polymers in the pretreatment or paint. Such functional groups include, but are not limited to, amino, epoxy, vinyl and mercapto groups. Suitable silane compounds include as nonlimiting examples aminoalkyltrialkoxysilanes such as aminopropyltriethoxysilane, sold under various trade names such as AMEO from Degussa AG of Düsseldorf, Germany and Silwet® A-1100 from Crompton Corporation of Greenwich, Conn., and an epoxy functional silane sold by Degussa under the trade name of Hydrosil® 2759. If used, the concentration of the organo-functional silane in an as-used composition is typically between 0.1 and 2.5 wt %, more typically between 0.1 and 1.0 wt %, and most typically between 0.3 and 0.6 wt %.

Preparation of the Compositions

Compositions according to the invention may be made by mixing the ingredients in any of a number of sequences. In one exemplary embodiment, the phosphonic acid is dissolved in about 50% of the water needed for the final formulation. Separately, an aqueous solution is prepared containing a catalyst and optionally a non-metallic base (for example ammonium hydroxide), using about 10% of the formulation water. This solution is added to the water/phosphonic acid mixture. Finally, a solution of PVA in the remaining 40% of required water is added to the other ingredients. All of these steps are preferably accompanied by good agitation, to prevent precipitation of insoluble species.

Application of the Compositions

In one embodiment of the invention, treatment of metal surfaces comprises 1) cleaning the metal surface, preferably with a first bath containing an alkaline cleaning solution; 2) rinsing the cleaned metal surface with water; and 3) contacting the rinsed metal surface with a composition according to the invention. Step 3) is also referred to as "pretreating" the metal surface, and the pretreatment composition may be applied from a bath, a spray, or by other means. However, as noted elsewhere herein, the coating may be used applications other than as a pretreatment, for example as a final coating.

Contacting of the metal surface may be performed by any known coating technique, including for example spraying, immersing, roll coating, or flow coating. Optionally, after step 3), the metal surface is dried and then a decorative or protective coating (e.g., paint) is applied, without rinsing between these steps. Thus, the pretreatment is a "dried-in-place" pretreatment.

The cleaning step removes oil and other contaminants from the surface of the metal, and is typically effected by immersing the metal surface in a bath of an alkaline cleaning solution to form a cleaned metal surface. The alkaline cleaning solution may be an aqueous solution of an alkaline cleaning agent. Some exemplary alkaline cleaning agents which can be used according to the present invention include sodium hydroxide and potassium hydroxide. Alternatively, the cleaning may be carried out with an acidic composition. Other means of cleaning may also be used in addition to, or instead of, alkaline cleaning baths. In some cases, cleaning may not be required at all, and this step may be omitted.

Preferably, the bath temperature during this cleaning step is between about 140° F. and about 180° F., more preferably between about 150° F. and about 170° F., and most preferably about 160° F., although the temperature can vary over a wide range depending on concentration and pH. Furthermore, the bath pH is preferably about 9 to about 12, more preferably from about 10 to about 1 The composition according to claim 1, and most preferably about 10.5.

A cleaning bath of either sodium or potassium hydroxide at a pH of 10.5 has been found to be particularly effective when applied at a temperature of 160° F. Depending on the exact cleaning solution used, and the nature of surface contaminants to be removed from the metal, the contact time of the metal with the bath typically varies between several seconds and 30 minutes. A cleaning bath is typically an aqueous solution of a cleaning agent and, optionally, at least one surfactant and at least one builder, which functions as a source of alkali and as a dispersant. Exemplary builders are soda ash or a tripolyphosphate. Similarly, a wide variety of surfactants may be used in the cleaning bath, such as the surfactants disclosed in U.S. Pat. No. 4,370,173 to Dollman. A sequestrant such as sodium gluconate may also be included to soften the water by binding calcium and magnesium. If the metal surface is heavily soiled, a detergent may be included in the cleaning bath.

The rinsing step is a conventional water rinsing step, preferably using deionized water, to remove any excess cleaner or detergent left on the metal surface from the cleaning step. The use of deionized water avoids the introduction of any deleterious ions, such as chloride or alkali metal ions, into the system.

After the metal surface is rinsed, it is treated with an aqueous composition of the sort described above according to the invention. The coating process can be effected by employing any of the coating techniques known in the art, such as spray, immersion, or flow coating techniques. The amount of coating is typically sufficient to leave from about 3.0 to 40.0 milligrams of the dried coating per each square foot of dried metal surface. By using a solution of higher concentration, it is possible to leave this amount of the dried coating with less solution.

One well-known coating technique is reverse roll coating, in which a sheet of metal is pulled between counter-rotating cylinders, i.e. cylinders that are rotating against the direction of travel of the sheet being unrolled. The solution is rolled down along these cylinders until it contacts the metal. As the sheet metal is passed between the cylinders in a direction against the direction of rotation of the cylinders, some wiping force is applied to the metal. Another conventional method is known as the quick-dip method, whereby sheet metal is dipped into a bath containing the coating composition and subsequently passed between two rollers to remove the excess. As will be appreciated by the person of normal skill in the art, the concentration, temperature, and pH of the bath are interrelated. Preferably, the bath temperature during this contacting step is about 70° F. to about 150° F., although the temperature can vary over a wide range depending on concentration and pH. The bath pH depends on the particular pretreatment composition used.

After coating, the metal is preferably dried (e.g., by blown air and/or an oven). The temperature for the drying operation may range from about 60° F. to about 400° F., with the duration of this step depending upon the temperature and flow rate of the air. Typically, no rinsing is performed after the drying step, thereby minimizing waste generation.

A decorative or protective coating may then optionally be applied to the dried metal surface. Typical non-limiting examples of decorative coatings include paints and lacquers, such as an acrylic paint sold by PPG Industries of Pittsburgh, Pa. under the trade name Duracron™ 1000.

Treatment with compositions according to the invention has been found to be useful for forming effective conversion coatings on cold-rolled and hot-rolled steel, electrogalvanized metals, hot dip galvanized metals, aluminum, brass, zinc, and Galfan® alloy (95% zinc, 5% aluminum). The compositions may provide effective coatings for galvanized metals, even in the absence of a subsequent paint or other coating. They may also be used as a final seal over another coating, for example over a zinc phosphate or iron phosphate conversion coating, rather than using a chrome-based treatment.

EXAMPLES

All tests were performed on 3"×6" steel panels obtained from Q-Panel Lab Products of Cleveland, Ohio cleaned with a potassium-based alkaline preparation (Bulk Kleen™ 842) commonly used to clean steel parts. The alkaline cleaner was prepared at 2% by volume and heated to 140° F. Panels were immersed for 90 seconds and then rinsed first in tap water for 60 seconds and then in deionized (less than 10 microsiemens) water for 45 seconds. Panels were then dried and divided into groups for application of experimental coatings. Two panels were prepared for each pretreatment composition, one for physical testing and one for accelerated corrosion testing (500 hours neutral salt spray).

The first series of tests studied the effect of varying the weight ratio of phosphonic acid to polyvinyl alcohol in the applied composition. The range of variation included the absence of phosphonic acids at one extreme and the absence of polyvinyl alcohols at the other. Solutions were prepared in deionized water on a weight to weight basis calculated on active % of supplied phosphonic acid (50% in the case of Dequest® 2000) and polyvinyl alcohol (8% in the case of Celvol™ 08-125), then diluted to 2% by volume in deionized water to provide working solutions having the compositions shown in Table 1. Working solutions were applied by immersion at room temperature for 45 seconds, followed by removal from the bath and drying with forced hot air. After pretreatment with the compositions, the panels were powder coated with Tiger Drylac polyester/TGIC RALa003 (available from Tiger Drylac, of Ontario, Calif.) and cured at 392° F. for 10 minutes in a gas fired oven. Average cured powder coating thickness was 1.5 mils. Test results are shown in Table 1.

TABLE 1

| Panel I.D. | wt % ATMP | wt % PVA | ATMP/PVA (wt./wt.) | Crosshatch Adhesion Test | Impact Test 80 Lbs. | Boiling Water Test | 500 Hour Salt Spray Corrosion |
|---|---|---|---|---|---|---|---|
| A-1 | 0.0006 | 0.0064 | 0.1 | PASS | NO LOSS | PASS | 35 mm |
| A-2 | 0.0032 | 0.0064 | 0.5 | PASS | NO LOSS | PASS | 35 mm |
| A-3 | 0.0064 | 0.0064 | 1.0 | PASS | NO LOSS | PASS | 23 mm |
| A-4 | 0.0192 | 0.0064 | 3.0 | PASS | NO LOSS | PASS | 2 mm |
| A-5 | 0.04 | 0.0064 | 6.25 | PASS | NO LOSS | PASS | 7 mm |
| A-6 | 0.064 | 0.0064 | 10.0 | PASS | NO LOSS | PASS | 5 mm |
| A-7 | 0 | 0.0064 | 0 | PASS | SOME LOSS | PASS | 10 mm |
| A-8 | 0.04 | 0 | N.A. | PASS | NO LOSS | PASS | 4 mm |

Note 1 - Crosshatch adhesion, impact, and boiling water test performed on 1st panel of each test. All tests were conducted in accordance with AAMA 2605, ASTM 1654-92, 3359-02.
Note 2 - Corrosion was evaluated at 500 hours neutral salt spray after inflicting a 4" scribe to the coated substrate. All measurements are in millimeters to the edge of the largest area of corrosion or powder coating delaminations, from the center scribe at 90°. Lower numbers indicate better performance. ASTM B117-03 for salt fog cabinet operation was used.

The results in Table 1 indicate the levels of corrosion resistance obtainable through use of several exemplary compositions of this invention.

A second series of panels was evaluated using working solutions over a range of pH values, with pH adjustments being made as necessary by the addition of a 21% ammonium hydroxide solution. Table 2 compiles the results of this test. In general, compositions of this invention will be used at a pH from about 2 to about 7.5, more typically from about 2 to about 6.5, most typically below 6. The ratio of phosphonic acid to PVA was 6.25 in all cases, using 0.04 wt % of ATMP and 0.0064 wt % of the Celvol™ 125 PVA. In the 500 hour salt spray corrosion test, lower numbers indicate better corrosion resistance.

TABLE 2

| Panel I.D. | pH | Adhesion Test | Boiling Water Test | Impact Test 80 Lbs. | 500 Hour Salt Spray Corrosion |
|---|---|---|---|---|---|
| B-1 | 1.41 | PASS | PASS | NO LOSS | 4 mm |
| B-2 | 2.48 | PASS | PASS | NO LOSS | 3 mm |
| B-3 | 3.89 | PASS | PASS | NO LOSS | 3 mm |
| B-4 | 5.75 | PASS | PASS | NO LOSS | 2 mm |

In a third series of panels, the results of using various phosphonic acids at a constant 6.25 to 1 weight ratio relative to Celvol™ 125 PVA was examined, using 0.04 wt % of the phosphonic acid and 0.0064 wt % of the PVA. Panel A-5 was considered a control, using ATMP as the phosphonic component. Table 3 shows the results of physical property and corrosion performance testing, demonstrating very good results for all examples.

TABLE 3

| Panel I.D. | Phosphonic Acid | Adhesion Test | Impact Test | Boiling Water Test | 500 Hour Salt Spray Corrosion |
|---|---|---|---|---|---|
| A-5*[1] | ATMP | PASS | PASS | PASS | 7 mm |
| C-1*[2] | 1-hydroxyethane-1,1-diphosphonic acid | PASS | PASS | PASS | 3 mm |
| C-2 | phosphonosuccinic acid | PASS | PASS | PASS | 3 mm |
| C-3*[3] | DTPMP | PASS | PASS | PASS | 10 mm |
| C-4 | aminomethyl-phosphonic acid | PASS | PASS | PASS | 6 mm |
| C-5 | vinylphosphonic acid | PASS | PASS | PASS | 9 mm |

*[1]Available from Solutia Inc. of St. Louis, MO as Dequest® 2000.
*[2]Available from Solutia Inc. as Dequest® 2010.
*[3]Available from Solutia Inc. as Dequest® 2060.

In a fourth series of experiments, PVA's having various molecular weights and degrees of hydrolysis were substituted for Celvol™ 125 to observe the effect this would have on corrosion resistance. All samples were prepared using ATMP at a 6.25 weight to weight ratio relative to PVA, using 0.04 wt % of the phosphonic acid and 0.0064 wt % of the PVA. As shown in Table 4, a decrease in the degree of hydrolysis and increase in average molecular weight tended to offer an increased ability to resist corrosion.

TABLE 4

| Panel I.D. | Polyvinyl Alcohol | M.W. Average Range | Degree of Hydrolysis | 500 Hour Salt Spray Corrosion |
|---|---|---|---|---|
| A-5 | Celvol™ 125 | 85,000-124,000 | 99.3 | 7 mm |
| E-1 | Celvol™ 165 | 146,000-186,000 | 99.3 | 6 mm |
| E-2 | Celvol™ 350 | 146,000-186,000 | 98.8 | 4 mm |
| E-3 | Celvol™ 540 | 146,000-186,000 | 87.0 | 3 mm |

To compare the efficacy of the phosphonic acid/polyvinyl alcohol mixture with that of other common pretreatments used on steel, and to test the effect of including an organofunctional silane and a zirconium compound on formulation performance, panel series D and F were prepared, coated and tested. The ratio of phosphonic acid to PVA was 6.25 in all cases, using 0.04 wt % of the phosphonic acid and 0.0064 wt % of the PVA. Results of these comparisons are shown in Table 5.

TABLE 5

| Panel I.D. | Variation | Adhesion Test | Impact Test | Boiling Water | 500 Hour Salt Spray Corrosion |
|---|---|---|---|---|---|
| A-5 | ATMP/PVA-125 (6.25 ratio w/w) | PASS | PASS | PASS | 7 mm |
| D-1 | ATMP/PVA-125, A-1100 aminosilane at .1% | PASS | PASS | PASS | 10 mm |
| D-2 | ATMP/PVA-125/Ammonium Fluozirconate .1% | PASS | PASS | PASS | 3 mm |
| F-1 | Chlorate accelerated iron phosphate | PASS | PASS | PASS | 6 mm |
| F-2 | F-1 with ATMP/PVA-125 seal | PASS | PASS | PASS | 4 mm |
| F-3 | A-1100 aminosilane at 0.1% | PASS | PASS | PASS | 11 mm |
| F-4 | Manganese Phosphate, 400 mg/ft$^2$ | 10% LOSS | FAIL - 100% LOSS | FAIL - 100% LOSS | 1 mm |
| F-5 | F-4 with ATMP/PVA 125 seal | 10% LOSS | FAIL - 100% LOSS | FAIL - 100% LOSS | 1 mm |
| F-6 | Zinc Phosphate, 200 mg/ft$^2$ | PASS | 20% LOSS | PASS | 4 mm |
| F-7 | F-6 with ATMP/PVA 125 seal | PASS | PASS | PASS | 1 mm |

The results in Table 5 indicate an increase in corrosion resistance with the addition of a small amount of a zirconium bearing compound, and improvement in test results over standard iron and zinc phosphate pretreatments.

Another series of experiments was performed to investigate the performance of compositions according to the invention in preventing corrosion on unpainted hot-dip galvanized (HDG) substrates under neutral salt spray exposure conditions in accordance with ASTM B-117-03. ACT 4×12×0.030 60G hot-dipped galvanized panels, available from ACT Laboratories of Hillsdale, Mich., were cleaned using the same methods used for the cold rolled steel panels in the experiments described previously above. Formulations consisting of varying types and amounts of phosphonic acids and polyvinyl alcohols were prepared, additionally including in some cases flouzirconium and/or aminosilane compounds. The solutions were applied to the HDG panels by immersion for 45 seconds. After forced hot air drying the panels were exposed to neutral salt spray for six hours without further topcoating with paint. Upon removal, the area of the panel covered with white rust was rated and the results summarized in Table 6. Two runs using only cleaned HDG served as controls for purposes of comparison. PVA 125 was Celvol™ 125, and PVA 540 was Celvol™ 540, both available from Celanese.

TABLE 6

| RUN | ATMP WT % | HEDP WT % | PBTC WT % | PVA 125 WT % | PVA 540 WT % | AMINOPROPYL-TRIETHOXY SILANE WT % | AMMONIUM FLUOZIRCONATE WT % | % SURFACE WHITE RUST |
|---|---|---|---|---|---|---|---|---|
| Control | — | — | — | — | — | — | — | 100% |
| 1 | 0.20 | — | — | 0.032 | — | — | — | 95% |
| 2 | — | 0.20 | — | 0.032 | — | — | — | 90% |
| 3 | — | — | 0.20 | 0.032 | — | — | — | 65% |
| 4 | 0.20 | — | — | — | 0.032 | — | — | 90% |
| 5 | — | 0.20 | — | — | 0.032 | — | — | 90% |
| 6 | — | — | 0.20 | — | 0.032 | — | — | 90% |
| 7 | 0.20 | — | — | 0.032 | — | — | 0.10 | 20% |
| 8 | 0.20 | 0.20 | — | 0.016 | 0.016 | — | — | 90% |
| 9 | 0.20 | — | — | 0.032 | — | 0.12 | 0.10 | 80% |
| 10 | 0.20 | — | — | 0.032 | — | 0.12 | — | 5% |
| Control | — | — | — | — | — | — | — | 90% |

As can be seen from the results in Table 6, very good performance resulted from the addition of an aminosilane to compositions of this invention for treatment of galvanized surfaces.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A composition for forming a coating on a metal surface, the composition comprising a phosphonic acid, polyvinyl alcohol, water, and a catalyst selected from the group consisting of group IV-B compounds, boron compounds, vanadium compounds, and molybdenum compounds, wherein the composition has a pH between 3.5 and 6.5 and a nonvolatiles content in a range from 0.007 wt % to 3.52 wt %, contains less than 500 ppm in total of alkali metals, and is essentially free of insoluble species, and wherein the phosphonic acid is selected from the group consisting of aminomethylphosphonic acid, vinylphosphonic acid, phosphonosuccinic acid, 2-phosphonobutane-1,2,4-tricarboxylic acid and polyphosphonic acids.

2. The composition according to claim 1, wherein the composition contains less than 50 ppm in total of alkali metals.

3. The composition according to claim 1, wherein the phosphonic acid comprises amine functionality.

4. The composition according to claim 1, wherein the phosphonic acid comprises aminotrimethylenephosphonic acid.

5. The composition according to claim 1, wherein the phosphonic acid comprises aminomethylphosphonic acid.

6. The composition according to claim 1, wherein the phosphonic acid comprises diethylenetriaminepentamethylenephosphonic acid.

7. The composition according to claim 1, wherein the phosphonic acid comprises one or more acids selected from the group consisting of vinylphosphonic acid, 1-hydroxyethane-1,1-diphosphonic acid, hexamethylenediaminetetramethylenephosphonic acid, 2-phosphonobutane-1,2,4-tricarboxylic acid, and mixtures thereof.

8. The composition according to claim 1, wherein the catalyst consists of at least one group IV-B compound.

9. The composition according to claim 8, wherein said at least one group IV-B compound comprises fluozirconate.

10. The composition according to claim 8, wherein said at least one group IV-B compound comprises ammonium zirconium carbonate.

11. The composition according to claim 8, wherein said at least one group IV-B compound comprises zinc ammonium zirconium carbonate.

12. The composition according to claim 1, wherein said catalyst comprises ammonium biborate.

13. The composition according to claim 1, wherein the pH of the composition is between 3.5 and 6.0.

14. The composition according to claim 1, wherein the polyvinyl alcohol comprises a first polyvinyl alcohol component having a weight average molecular weight between 85,000 and 124,000 Daltons and less than 1.0 mol % acetate ester content based on moles of vinyl repeating units, and a second polyvinyl alcohol component having a weight average molecular weight between 146,000 and 186,000 Daltons, wherein a weight ratio of the first polyvinyl alcohol component to the second polyvinyl alcohol component is between 1:1 and 3:1.

15. The composition according to claim 1 further comprising an organo-functional silane.

16. The composition according to claim 15, wherein the organo-functional silane comprises aminopropyltriethoxysilane.

17. The composition according to claim 1, wherein the composition also comprises ammonia.

18. The composition according to claim 1, wherein the composition further comprises ethanolamine, diethanolamine, or a combination of these.

19. A method of making the composition according to claim 1, the method comprising combining in aqueous solution a phosphonic acid, polyvinyl alcohol, and a catalyst selected from the group consisting of group IV-B compounds, boron compounds, vanadium compounds, and molybdenum compounds, wherein the phosphonic acid is selected from the group consisting of aminomethylphosphonic acid, vinylphosphonic acid, phosphonosuccinic acid, 2-phosphonobutane-1,2,4-tricarboxylic acid and polyphosphonic acids.

20. The method of claim 19, wherein the step of combining the phosphonic acid, the polyvinyl alcohol, and the catalyst comprises combining a first aqueous mixture comprising the polyvinyl alcohol with a second aqueous mixture comprising said at least one of a group IV-B compound and a boron compound, said second aqueous mixture having a pH between 4 and 7.

21. A method of forming a coating on a metal surface, the method comprising applying to the metal surface a composition comprising a phosphonic acid, polyvinyl alcohol, water, and a catalyst selected from the group consisting of group IV-B compounds, boron compounds, vanadium compounds, and molybdenum compounds, said phosphonic acid being soluble in the composition, wherein the composition has a pH between 3.5 and 6.5 and a nonvolatiles content in a range from 0.007 wt % to 3.52 wt %, contains less than 500 ppm in total of alkali metals, and is essentially free of insoluble species, and wherein the phosphonic acid is selected from the group consisting of aminomethylphosphonic acid, vinylphosphonic acid, phosphonosuccinic acid, 2-phosphonobutane-1,2,4-tricarboxylic acid and polyphosphonic acids.

22. The method of claim 21, wherein the metal surface comprises a ferrous metal.

23. The method of claim 21, wherein the metal surface comprises aluminum.

24. A metal surface having disposed thereon a solid coating made by a method comprising applying to the metal surface a composition comprising a phosphonic acid, polyvinyl alcohol, water, and a catalyst selected from the group consisting of group IV-B compounds, boron compounds, vanadium compounds, and molybdenum compounds, said phosphonic acid being soluble in the composition, wherein the phosphonic acid is selected from the group consisting of aminomethylphosphonic acid, vinylphosphonic acid, phosphonosuccinic acid, 2-phosphonobutane-1,2,4-tricarboxylic acid and polyphosphonic acids.

25. A composition for forming a coating on a metal surface, the composition comprising a phosphonic acid, polyvinyl alcohol, water, and a catalyst selected from the group consisting of group IV-B compounds, boron compounds, vanadium compounds, and molybdenum compounds, wherein a weight ratio of the phosphonic acid to the polyvinyl alcohol component is between 1:1 and 6:1, wherein the composition has a pH between 3.5 and 6.5 and a nonvolatiles content in a range from 0.007 wt % to 3.52 wt %, contains less than 500 ppm in total of alkali metals, and is essentially free of insoluble species, and wherein the phosphonic acid is selected from the group consisting of aminomethylphosphonic acid, vinylphosphonic acid, phosphonosuccinic acid, 2-phosphonobutane-1,2,4-tricarboxylic acid and polyphosphonic acids.

26. The composition according to claim 25, wherein a weight ratio of the phosphonic acid to the polyvinyl alcohol component is between 2.5:1 and 3.5:1.

27. The composition according to claim 1, wherein the phosphonic acid comprises vinylphosphonic acid.

* * * * *